United States Patent [19]
Hamilton et al.

[11] Patent Number: 5,764,759
[45] Date of Patent: Jun. 9, 1998

[54] CALL PROCESSING USING PREVIOUSLY OBTAINED LINE CHARACTERISTICS

[75] Inventors: Chris Hamilton, Montclair; Prabhakar Chitrapu, Princeton, both of N.J.

[73] Assignee: Dialogic Corporation, Parsippany, N.J.

[21] Appl. No.: 319,159

[22] Filed: Oct. 6, 1994

[51] Int. Cl.⁶ .................. H04M 9/00; H04B 3/20
[52] U.S. Cl. .................. 379/410; 406/408; 406/411
[58] Field of Search .................. 379/410, 88, 67, 379/406, 411, 388, 409, 414, 1, 3, 5, 6, 10, 408

[56] References Cited

U.S. PATENT DOCUMENTS

| | | |
|---|---|---|
| 4,914,692 | 4/1990 | Hartwell et al. ............... 379/410 |
| 4,956,838 | 9/1990 | Gilloire et al. ............... 379/410 |
| 5,155,760 | 10/1992 | Johnson et al. ............... 379/410 |
| 5,164,989 | 11/1992 | Brandman et al. ............... 379/408 |

*Primary Examiner*—Krista Zele
*Assistant Examiner*—Jacques M. Saint-Surin
*Attorney, Agent, or Firm*—Jeffrey I. Kaplan, Esq.; Kaplan & Gilman, L.L.P.

[57] ABSTRACT

A technique for utilization of call processing resources in a call processing system is disclosed wherein echo characteristics of a telephone line ascertained and utilized by a echo canceler, and are also stored for subsequent use by a different echo canceler which processes a call on that same telephone line. The technique may also be used with call processing resources other than echo cancelers.

8 Claims, 5 Drawing Sheets

CALL PROCESSING USING PREVIOUSLY OBTAINED LINE CHARACTERISTICS

TECHNICAL FIELD

This invention relates to call processing systems, and more particularly, to a call processing system which ascertains information about a telephone line from a set of resources which processes a call on the telephone line and then allows a different set of resources to utilize that information.

BACKGROUND OF THE INVENTION

Multiple line call processing systems are well known in the art and are typically implemented at call processing centers for receiving and processing customer calls as well as initiating outgoing calls. Typically, these systems are based upon a personal computer platform and include one or more voice boards. Each voice board includes multiple ports, where each port is connected to a separate telephone line.

FIG. 1 shows a functional block diagram of a typical voice processing board 101. Ports 102a and 102b are representative of the plurality of ports on voice processing board 101, and it is indicated in FIG. 1 that other such ports exist. Typical voice boards include four, eight, or even more ports. For each port on the voice processing board, there exists a line interface 103 and a Codec 104. These components are well known to those of ordinary skill in this field.

Other components present on voice board 101 include digital signal processing (DSP) chip 105 and associated RAM 106, and a control bus 107 for implementing communications among the various components of the voice board. The voice board also includes random access memory (RAM) 108, a control processor 110, and dual port RAM 109, which can be accessed directly by either the personal computer's (PC), processor or the voice board's processing components. The operation of a voice processing system, which is typically constructed from one or more such voice boards, will not be described in detail as it is well known to those of ordinary skill in this field.

In order to appreciate the problem to which the present invention is directed, consider the flow of signals from the voice board to the central office or PBX. Voice messages to be transmitted on channel a, for example, are read from the PC's hard disk (not shown), decompressed if necessary, and transmitted to Codec 104a. Codec 104a converts such messages into analog form and conveys the analog voice signals to line interface 103a for transmission to the telephone network. Line interface 103a, as is well known to those of ordinary skill in this art, reflects part of the analog signal back toward Codec 104a. This reflected signal, known in the industry as echo, is sent to DSP 105 and appears as if the voice signal had been transmitted from the remote caller. Indeed, this echoed signal can cause the voice board to detect DTMF tones which are not really present, or to take action that should only be taken if the remote caller speaks.

In order to solve this problem of echo, DSP 105 includes an echo canceler for each Codec. The echo canceler is usually implemented as a digital filter with a plurality of N taps. N is a parameter which varies from system to system and is often called the filter length. Numerous echo cancelers are well known to those of ordinary skill of this art.

The echo canceler operates on the outgoing signal to produce an estimate of the echoed signal. The estimate is then combined with the actual echoed signal in an attempt to cancel the actual echoed signal. If a substantial amount of the actual echoed signal remains, the echo canceler is adjusted to provide a better estimate of the actual echoed signal so that more cancellation occurs.

One defining characteristic of an echo canceler is its filter coefficients, the "weight" assigned to each of a plurality of feedback paths along the length of a digital filter. Most digital filters are adaptive in that these weights are dynamically changing as the system operates.

One problem with such prior art systems is that when operation of the system begins, the echo canceler operating on each particular line has absolutely no knowledge of the characteristics of that line or of the line interface. Accordingly, there is no way to determine how to set the coefficients of the echo canceler correctly. Therefore, at least initially, large echo results when a signal is transmitted out onto a telephone line.

As the echo canceler coefficients adjust themselves, the echo reduces and the coefficients continue to adjust so that the echo is minimized. While fluctuations in line conditions will always cause the echo canceler to be less than perfect, the echo canceler algorithm is arranged to constantly monitor the echo and to adjust the coefficients to minimize the echo level.

After a first telephone call on a particular line is completed, the next telephone call on that line will not cause as much echo initially. This is because the echo canceler assigned to that particular line is the same for each call and thus will utilize the coefficients that had been utilized at the end of the previous telephone call. Thus, while line conditions may change slightly from one call to the next, the echo canceler utilized to cancel echo on the second call will already be adjusted to the particular telephone line upon which it is operating. Thus, the coefficients will be somewhat close to where they should be and the severe initial echo encountered on the first telephone call will not be present on second and subsequent telephone calls.

The adjustment of echo canceling coefficients is not too severe a problem in most prior art systems because, as explained above, only the first telephone call includes any significant amount of time during which severe echo will occur. However, in recent systems, it is proposed to allow different groups of call processing resources to process calls arriving on different lines. Such a system is shown in conceptual block diagram form in FIG. 2. While the arrangement of FIG. 2 also includes a plurality of line interface circuits and Codecs as previously described, FIG. 2 also includes a switch 201 which permits calls from any line interface to be routed to any group of call processing resources.

A problem that arises with the arrangement of FIG. 2 is that even after a particular group of call processing resources processes a call and adapts the echo canceler coefficients to the particular telephone line over which the call arrives, there is no guarantee that the echo canceler will be used on the same telephone line in a subsequent call. This conceptual difference between the systems is indicated in functional block diagram form in FIGS. 3 and 4.

In FIG. 3, certain call processing resources 301–304 (e.g.; a DTMF detector 302, text to-speech-module 303, etc.) are present for each of the two channels a and b in the call processing system. Thus, when echo canceler 301a adjusts its coefficients, these coefficients take into account the characteristics of line a and line interface 103a, and more particularly, the echo characteristics thereof. Similarly, echo canceler 301b takes into account these characteristics associated with line b. Thus, as previously described, once echo canceler 301a adjusts its coefficients to a particular call on line a, those coefficients may be used on a subsequent call.

FIG. 4 shows a conceptual diagram of a proposed more modern call processing system. The numerous resources 401–407 are exemplary of those that would be in call processing resources block 203 of FIG. 2. (Switch 201 is not shown in FIG. 4 for purposes of clarity) The resources may even be located on different computers, in which case switch 201 could actually be a network.

In the arrangement of FIG. 4, the system includes a plurality of different resources 408, any one or more of which may be utilized to process a call. The dotted outline of FIG. 4 shows that resources 400–404 have been configured as a group in order to process a call on line a. Line b is shown but for purposes of clarity, is not shown as connected to any group of resources.

In the system of FIG. 4, numerous copies of many different resources are available at any time and the system simply configures a logical group to be dedicated to handling a call arriving on a particular line. Resources may enter or exit the group as needed.

The concept of configuring and dismantling groups of resources in order to handle a call is fully described in co-pending U.S. patent application Ser. No. 08/192,668 ("the '668 application") entitled Group Exchange Port (GXP) and assigned to the assignee of the present invention. The echo canceler and other resources may be grouped together logically by physically arranging the switch 201 to transmit the incoming signals to the appropriate resources for processing. A Time Division Multiple Access (TDM) switch may be used for this purpose. For example, in order to allow echo canceler 404 to operate as part of a group of resources processing a call from line interface 103a, switch 201 is arranged such that signals from line interface 103a are routed to echo canceler 404. The "switch" may be a hardware component, or a software decision that a particular routine is utilized to process signals received from line a.

It can be appreciated from the diagram of FIG. 4 that an echo canceler or other resource may be utilized on any one of a number of channels. For example, echo canceler 404 is shown as being part of a group to service a call on line a. As explained in the '668 application, when echo canceler 404 is no longer needed by the call on line a, it will be placed into a general pool of available resources and may be utilized by any other call on any other line in order to cancel echoes when needed. Thus, unlike the arrangement of FIG. 3, the echo canceler cannot simply start using the coefficients from a previous call because such coefficients are optimized for characteristics of a different line interface unit and a different telephone line.

Therefore, the problem with these prior arrangements is that each time an echo canceler is allocated to a particular line, it must reconfigure itself to cancel echoes resulting from the characteristics of the particular telephone line and the particular line interface. Thus, severe echoes result each time an echo canceler is allocated to a call.

SUMMARY OF THE INVENTION

The above and other problems of the prior art are overcome in accordance with the present invention which relates to a method and apparatus for permitting information associated with a line interface and/or telephone line to be saved and utilized by a resource later servicing that line or line interface.

In accordance with one exemplary embodiment of the invention, an echo canceler assigned to a group which processes a particular telephone call acquires information about the characteristics of that line, and adjusts the echo cancellation coefficients accordingly. When the echo canceler is no longer needed by that telephone line, the coefficients are saved in a portion of memory which is indicated to be the coefficients associated with that particular telephone line. The next time that telephone line is serviced by a group which includes an echo canceler, the new echo canceler starts out by utilizing the coefficients previously saved, which coefficients are indicative of characteristics on that telephone line.

By storing the coefficients associated with each particular telephone line, each time new resources are configured to service that telephone line, the resources can access the information previously deduced regarding that particular telephone line (e.g.; the best echo canceler coefficients to use). As a result, the arrangement of FIG. 4 can operate on all subsequent calls that arrive on a telephone line with the same prior knowledge of that telephone line which is present in the more conventional system of FIG. 3.

DETAILED DESCRIPTION OF THE PREFERRED EMBODIMENT

Figure 1:
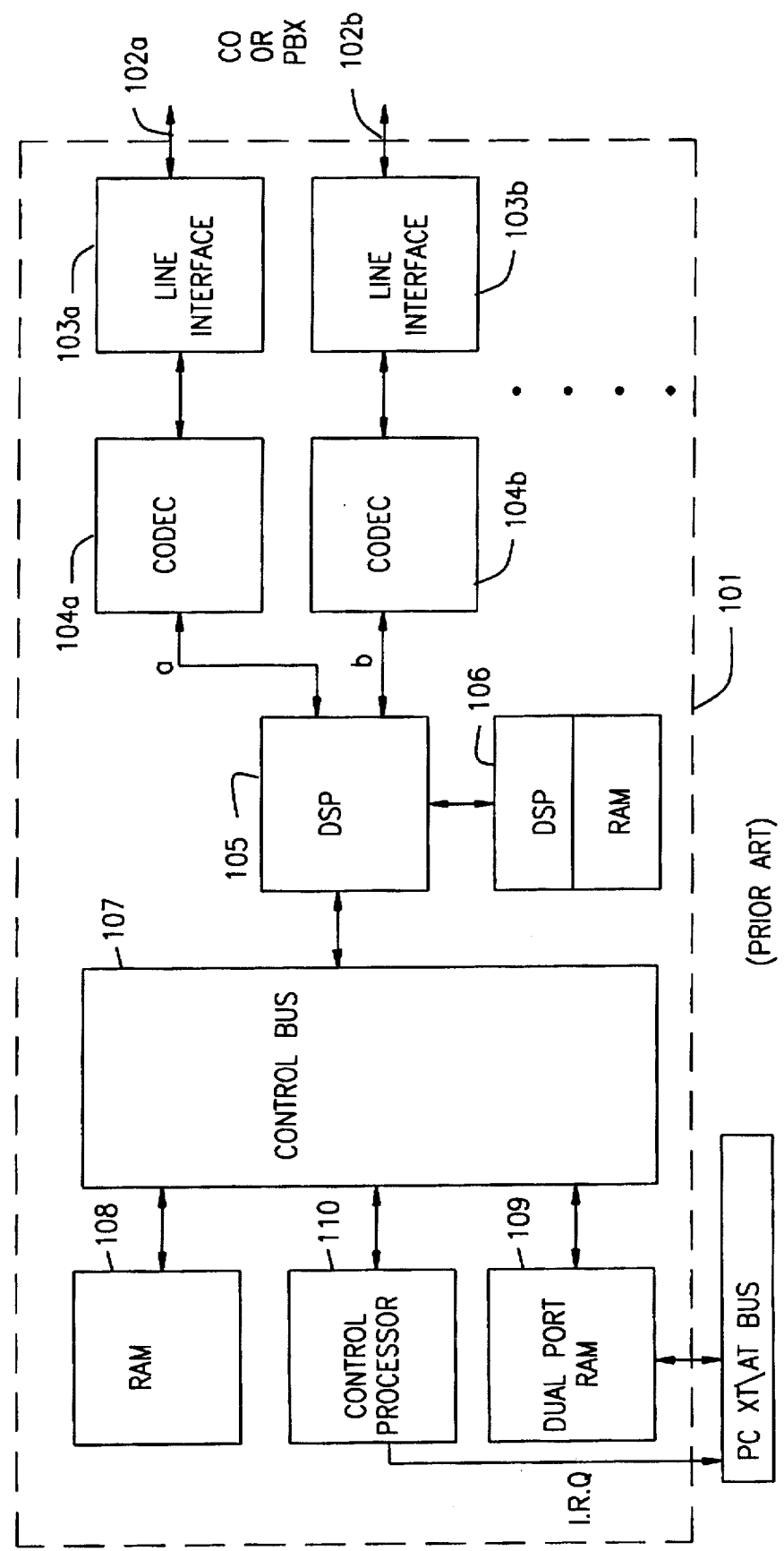
FIG. 1 is a block diagram of a conventional voice board.
Figure 2:
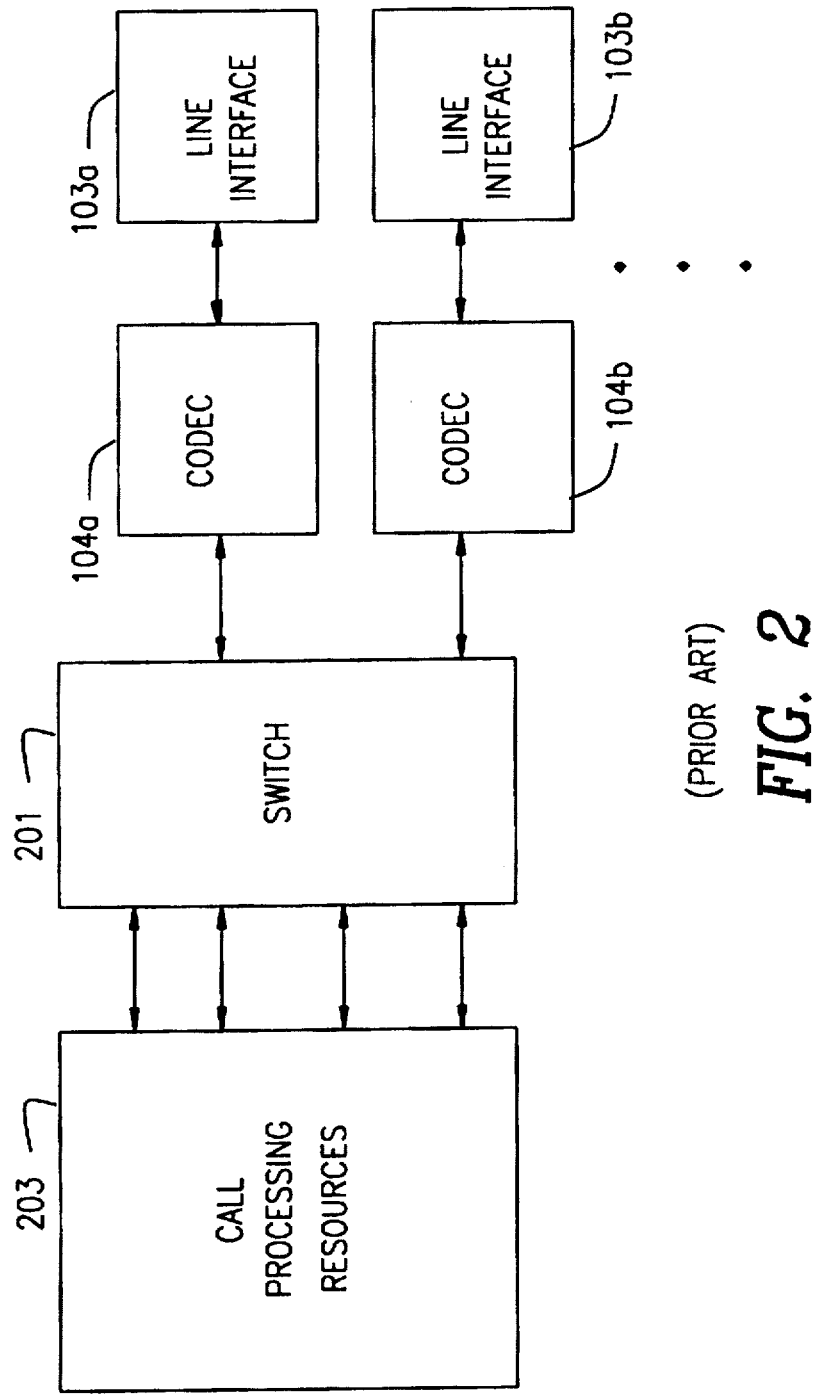
FIG. 2 is a functional block diagram showing a more modern voice processing system in which resources may be arranged to handle calls arriving on any telephone line.
Figure 3:
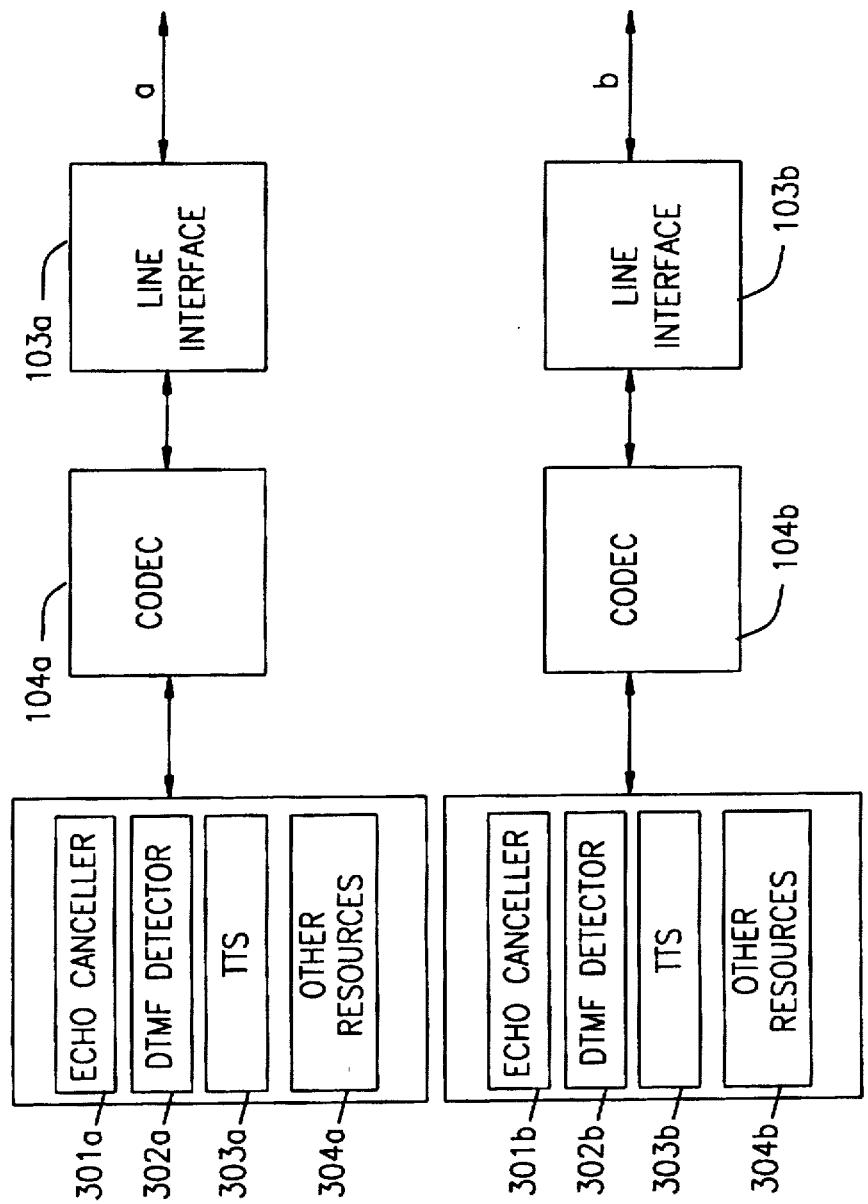
FIG. 3 is a more detailed diagram showing resources configured to handle calls on two telephone lines.
Figure 4:
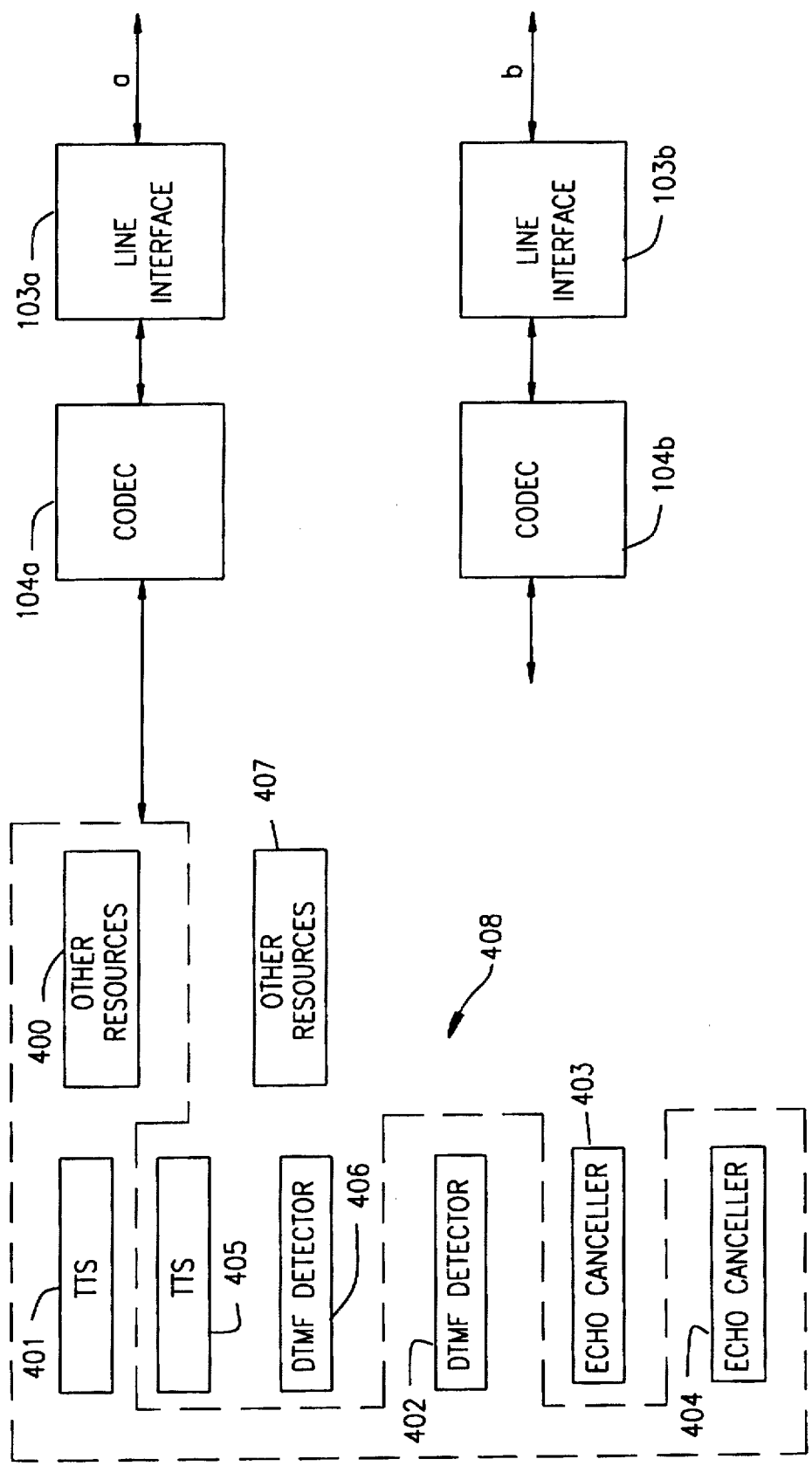
FIG. 4 shows a functional block diagram of a system whereby numerous resources may be grouped together in order to service a telephone call from particular telephone line.

Referring to FIG. 2, call processing resources 203 include a variety of functions such as shown in FIG. 4 as well as others. Switch 201 is arranged such that signals coming from any of Codecs 104 may be routed to any of a variety of such call processing resources 203.

In operation, a call arrives on, for example, line interface 103a and a group of resources is configured to process such call. The resource group might include, for example, a DTMF detector, an echo canceler, etc. As a call is processed, signals received by switch 201 from Codec 104a are routed to the appropriate resources reserved for processing of that particular call. For example, with reference to FIG. 4, a signal received from Codec 104a is routed to DTMF detector 402 and to echo canceler 404 so that each of these functional blocks can perform their particular algorithm upon the signal being received. Concerning signal flow from the voice processing system to the remote caller, exemplarily resource TTS 401 is utilized for text to speech conversion, and signals from TTS 401 are routed by switch 201 through Codec 104a to line interface 103a.

After full processing of the particular call, the telephone line connection to which line interface 103a is connected is terminated, and line interface 103a is then available to receive a subsequent call. However, upon such termination, the echo canceler coefficients last used to process the call are stored in a predetermined location of RAM which is known to the switch 201.

When a subsequent call arrives, or is made via line interface 103a and Codec 104a, the software allocates any available echo canceler from the group of resources 408. When the echo canceler is allocated, the coefficients from the previous call are loaded into that echo canceler prior to the beginning of operation to process the subsequent call. Thus, all other subsequent calls obtain the benefit of information about the characteristics of the telephone line which have been previously deduced during a prior telephone call.

Figure 5:
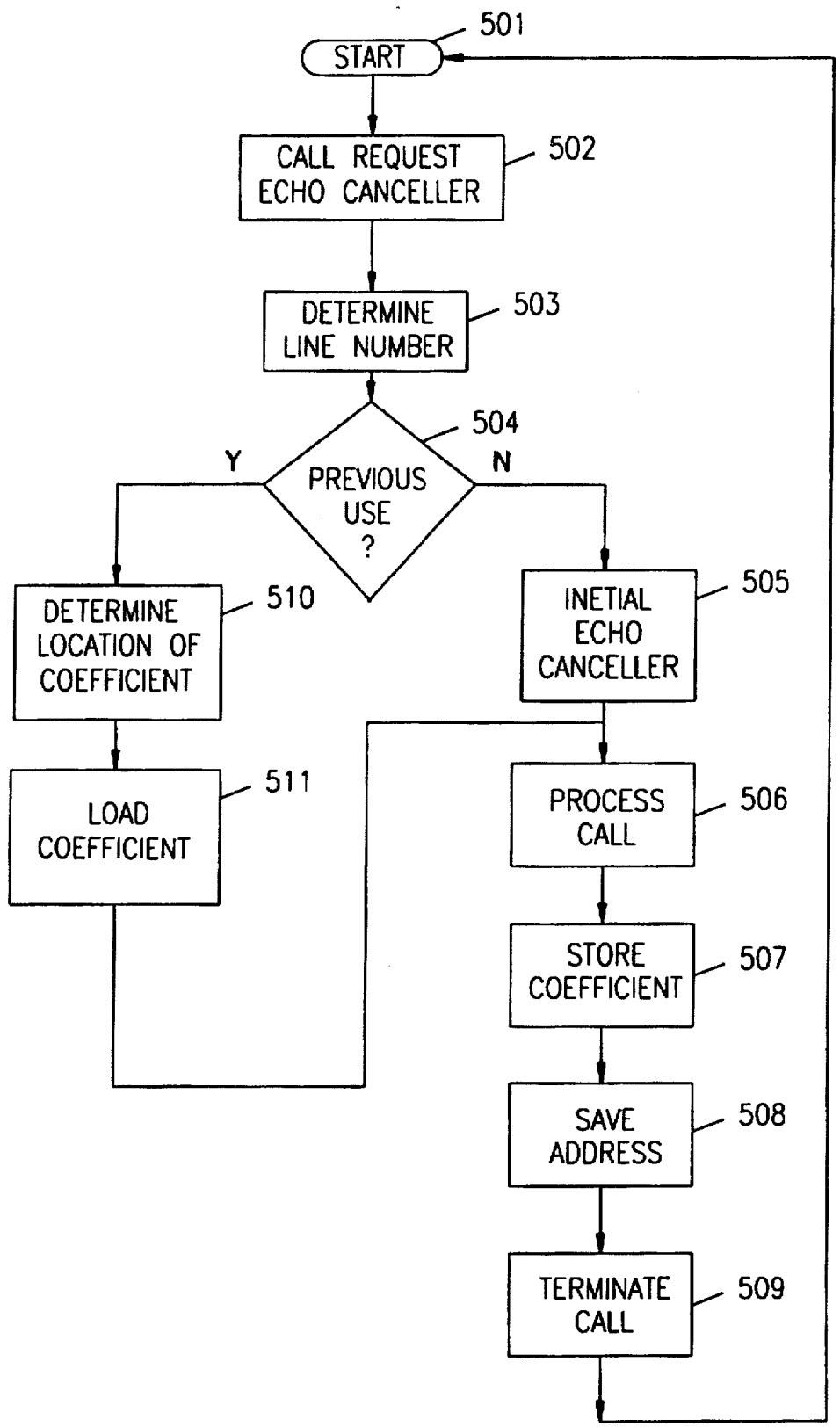
FIG. 5 shows a flow chart for use in implementation of the present invention.

FIG. 5 shows that flow chart which can be utilized implementing the present invention. The blocks of FIG. 5 are meant to represent functions and are not intended to imply any hardware or software configuration.

The flow chart is entered at start 501 wherein a call is in progress. When an echo canceler is required by a call, the call requests an echo canceler at block 502. The echo canceler may be requested immediately after the call begins, or may be requested and allocated to that call upon particular conditions requiring the echo canceler (e.g., playback). After the echo canceler is requested, the system determines a particular line number over which the call is in progress at block 503. This line number is then used in decision block 504 to determine if the line has been previously used since the system began operation.

If the telephone line over which the present call is taking place has not been previously utilized, then control is transferred to block 505 where initial echo canceler coefficients are loaded into the echo canceler to be utilized during the telephone call. The initial echo canceler coefficients utilized in accordance with prior art techniques. Control is then transferred to block 506 where processing of the call takes place.

During processing of the call, the coefficients of the echo canceler are adopted in order to minimize the echo. Techniques of performing this adaptation, including minimization of an error signal, are well known to those of ordinary skill in this art and will not be described in detail. It is noted however, that as call processing completes, the echo canceler coefficients will be adjusted to reflect the characteristics of the particular telephone line and line interface. The coefficients are then stored at block 507, and the address at which such coefficients are stored is saved at block 508. Block 509 then terminates the call and transfers control back to start 501 to await the next call to be serviced.

Returning to decision block 504, if a line number over which the present call is being processed has previously been used, then operational block 510 determines the location of the coefficients for use with that particular telephone line. Block 510 may operate by utilizing the line number to as an input to an address decoder which maps line number memory location. Of course, other techniques for determining the location of the coefficient are possible.

Once it is determined where in memory the proper coefficients are stored, operational block 511 loads those coefficients into an echo canceler allocated for use in processing the call, and control is then transferred to operational block 506 for normal call processing. Thus, it can be appreciated that coefficients derived during processing of the previous telephone call on the particular line in question are utilized for a subsequent call on that same telephone line.

While the above describes the preferred embodiment of the invention, it is understood that various other modifications and/or additions will be apparent to those of ordinary skill of the art. For example, the echo canceler may be allocated during process of each telephone call, rather than at the beginning thereof. Moreover, while echo canceler coefficients are one example of information concerning line characteristics, resources other than echo cancelers may utilize the benefit of the present invention. All such modifications are intended to be covered by the following claims.

We claim:

1. A method of utilizing call processing resources in a call processing system, said method comprising:

ascertaining echo canceller coefficients optimized for a communications line;

utilizing said echo canceller coefficients at a call processing resource to process a call associated with said communications line; and utilizing said ascertained echo canceller coefficients at a second call processing resource to process a second call over said communications line.

2. The method of claim 1 wherein said information concerns transmission characteristics.

3. The method of claim 2 wherein said transmission characteristics are echo characteristics.

4. A call processing apparatus comprising:

a plurality of call processing resources;

means for ascertaining echo canceller coefficients optimized for a communications line;

means for utilizing said echo canceller coefficients at a call processing resource to process a call associated with said communications line; and means for utilizing said ascertained echo canceller coefficients in a second call processing resource to process a second call on said communications line.

5. Apparatus of claim 4 wherein said means for ascertaining information includes means for ascertaining transmission characteristics.

6. Apparatus of claim 5 wherein said means for ascertaining transmission characteristics includes means for ascertaining echo characteristics.

7. Apparatus for processing calls in a call processing system comprising:

a plurality of communications line interfaces, each connected to a separate communications line;

switching means for switching signals received from specific line interfaces to specific call processing resources;

means at the call processing resources for ascertaining echo canceller coefficients a communications line over which a call to be processed is being communicated; and means for utilizing echo canceller coefficients ascertained during a first call for processing a second telephone call.

8. Apparatus of claim 7 wherein said transmission characteristics relate to echo cancellation.

* * * * *